US009620966B2

(12) United States Patent
Arisawa

(10) Patent No.: US 9,620,966 B2
(45) Date of Patent: *Apr. 11, 2017

(54) POWER RECEIVING DEVICE, CONTROL METHOD OF POWER RECEIVING DEVICE, AND POWER FEEDING SYSTEM

(71) Applicant: Sony Corporation, Tokyo (JP)

(72) Inventor: Shigeru Arisawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,450

(22) Filed: Sep. 14, 2015

(65) Prior Publication Data
US 2016/0006268 A1    Jan. 7, 2016

Related U.S. Application Data

(63) Continuation of application No. 13/790,492, filed on Mar. 8, 2013, now Pat. No. 9,157,337.

(30) Foreign Application Priority Data

Apr. 10, 2012  (JP) ................................. 2012-089053

(51) Int. Cl.
H02J 5/00       (2016.01)
F01K 25/00      (2006.01)
H02K 1/00       (2006.01)

(52) U.S. Cl.
CPC .............. *H02J 5/005* (2013.01); *F01K 25/00* (2013.01); *H02K 1/00* (2013.01)

(58) Field of Classification Search
CPC ....................................................... H02J 5/005
USPC .......................................................... 307/104
See application file for complete search history.

(56) References Cited

U.S. PATENT DOCUMENTS 9,157,337 B2 * 10/2015 Arisawa .................. F01K 25/00

FOREIGN PATENT DOCUMENTS

JP         2012-016125 A    1/2012

* cited by examiner

Primary Examiner — Robert Deberadinis
(74) Attorney, Agent, or Firm — Chip Law Group

(57) ABSTRACT

A power receiving device including: a power receiving coil configured to receive power when a power feeding device supplies the power via a magnetic field; an alternating-current power supply configured to apply an alternating voltage to the power receiving coil; and a foreign matter detecting section configured to generate an amount of change in impedance of the power receiving coil from a current induced in the power receiving coil to which the alternating voltage is applied and the alternating voltage, and detect foreign matter between the power receiving coil and the power feeding device on a basis of the amount of change.

11 Claims, 18 Drawing Sheets

FIG.7

| TIMER VALUE T (0<Ts<Te) | OPERATION OF POWER FEEDING DEVICE CONTROL PORTION | OPERATION OF ALTERNATING-CURRENT POWER SUPPLY CONTROL PORTION |
|---|---|---|
| 0<T<Ts (WITHIN POWER FEEDING PERIOD) | MAKE POWER FEEDING STARTED AFTER APPLICATION OF ALTERNATING VOLTAGE IS STOPPED | — |
| T=Ts (START OF MONITORING PERIOD) | MAKE POWER FEEDING STOPPED | — |
| Ts<T<Te (WITHIN MONITORING PERIOD) | — | MAKE APPLICATION OF ALTERNATING VOLTAGE STARTED AFTER POWER FEEDING IS STOPPED |
| T=Te (END OF MONITORING PERIOD) | — | MAKE APPLICATION OF ALTERNATING VOLTAGE STOPPED |

POWER RECEIVING DEVICE, CONTROL METHOD OF POWER RECEIVING DEVICE, AND POWER FEEDING SYSTEM

CROSS REFERENCE TO RELATED APPLICATIONS

This is a Continuation Application of U.S. application Ser. No. 13/790,492, filed Mar. 8, 2013, which claims priority to Japanese Patent Application No. 2012-089053, filed Apr. 10, 2012, the entire contents of which are incorporated herein by reference.

BACKGROUND

The present technology relates to a power receiving device, a control method of the power receiving device, and a power feeding system, and particularly to a power receiving device in a noncontact power feeding system for feeding power in an electrically noncontact manner, a control method of the power receiving device, and the power feeding system.

In related art, a noncontact power feeding system for feeding power in an electrically noncontact manner may include a circuit for detecting, as foreign matter, an object mixed in a magnetic field between a power feeding device and a power receiving device. This is because when foreign matter as a conductor is mixed in the magnetic field, an eddy current occurs within the foreign matter, and the foreign matter may generate heat due to an effect of a Joule heat caused by the eddy current. A large amount of heat generated by the foreign matter may cause damage to a device or a casing in the noncontact power feeding system. In quick charging, in particular, the intensity of a magnetic field output by the power feeding device is increased, so that the amount of heat generated by the foreign matter is also increased. Thus, the presence of the foreign matter often becomes a problem.

A circuit that determines whether foreign matter is present or not on the basis of whether or not the amplitude of a voltage induced on a power receiving side is less than a reference value, for example, has been proposed as a circuit for detecting foreign matter (see Japanese Patent Laid-Open No. 2012-16125, for example). When foreign matter is present, the eddy current of the foreign matter causes a power loss, and decreases power transmission efficiency. It is thus determined that foreign matter is present when the amplitude of the voltage on the power receiving side is decreased to less than the reference value.

SUMMARY

However, the above-described related art may not be able to correctly detect the presence of foreign matter. Specifically, the above-described power receiving device may erroneously detect foreign matter when the amplitude of the voltage of a power receiving coil is decreased by a cause other than the mixing in of foreign matter. A decrease in the amplitude of the voltage is caused not only by the mixing in of foreign matter but also by a decrease in fed power or power feeding efficiency due to a failure, a secular degradation, or the like of the power feeding device, for example. However, the above-described power receiving device does not obtain an amount of fed power or power transmission efficiency. In addition, the above-described power receiving device does not assume a case in which a power feeding coil and the power receiving coil are displaced from each other.

Thus, when the amplitude of the voltage is decreased, whether the decrease is caused by the mixing in of foreign matter or caused by a decrease in fed power or power transmission efficiency cannot be determined. In addition, when the amplitude of the voltage is decreased, whether the decrease is caused by the positional displacement of the power feeding coil and the power receiving coil with respect to each other or caused by the mixing in of foreign matter cannot be determined. As a result, erroneous foreign matter detection may occur when the amplitude of the voltage is decreased by a factor other than the mixing in of foreign matter.

The present technology has been created in view of such a situation, and it is desirable to provide a power receiving device that can correctly detect foreign matter.

According to a first embodiment of the present technology, there are provided a power receiving device and a control method of the power receiving device. The power receiving device includes: a power receiving coil configured to receive power when a power feeding device supplies the power via a magnetic field; an alternating-current power supply configured to apply an alternating voltage to the power receiving coil; and a foreign matter detecting section configured to generate an amount of change in impedance of the power receiving coil from a current induced in the power receiving coil to which the alternating voltage is applied and the alternating voltage, and detect foreign matter between the power receiving coil and the power feeding device on a basis of the amount of change. This produces an effect of detecting the foreign matter on the basis of the amount of change in impedance of the power receiving coil.

In addition, in the first embodiment, the power receiving device may further include a power supply control block configured to control the power feeding device on a basis of a result of detection of the foreign matter. This produces an effect of controlling the power feeding device on the basis of the result of detection of the foreign matter.

In addition, in the first embodiment, at a time of the detection of the foreign matter between the power feeding device supplying the power and the power receiving device, the power supply control block may control the alternating-current power supply to make the alternating-current power supply apply the alternating voltage after controlling the power feeding device to make the power feeding device stop supplying the power. This produces an effect of applying the alternating voltage after the supply of the power is stopped, at the time of the detection of the foreign matter.

In addition, in the first embodiment, the power supply control block may alternately repeat a power feeding period for controlling the power feeding device and a monitoring period for detecting the foreign matter, and make the power feeding device supply the power in the power feeding period and make the alternating-current power supply apply the alternating voltage in the monitoring period. This produces an effect of supplying the power in the power feeding period and applying the alternating voltage in the monitoring period.

In addition, in the first embodiment, the power supply control block may make the power feeding device supply the power in the power feeding period when it is determined that the foreign matter is not present. This produces an effect of supplying the power when it is determined that the foreign matter is not present.

In addition, in the first embodiment, the power receiving device may further include a control amount determining section configured to determine an amount of control for the power on a basis of the amount of change and the induced current when it is determined in the detection of the foreign matter that the foreign matter is present. The power supply control block in the power receiving device controls the power feeding device according to the amount of control in the power feeding period when the amount of control is determined. This produces an effect of controlling the power feeding device according to the amount of control when it is determined that the foreign matter is present.

In addition, in the first embodiment, the power receiving device may further include a control signal transmitting circuit configured to transmit a control signal for controlling the power feeding device to the power feeding device. The power supply control block in the power receiving device controls the power feeding device by generating the control signal and making the control signal transmitting circuit transmit the control signal. This produces an effect of controlling the power feeding device by transmitting the control signal.

In addition, in the first embodiment, the power receiving device may further include a charging control circuit configured to control a charging current to a load connected to the power receiving device on a basis of a result of detection of the foreign matter. This produces an effect of controlling the charging current on the basis of the result of detection of the foreign matter.

The power receiving device may further include a control result transmitting circuit configured to transmit a result of control of the charging current to the power feeding device. This produces an effect of transmitting the result of control of the charging current to the power feeding device.

In addition, in the first embodiment, the impedance can include at least one of a resistance and a reactance of the power receiving coil. This produces an effect of detecting the foreign matter on the basis of an amount of change in at least one of the resistance and the reactance of the coil.

In addition, in the first embodiment, the foreign matter detecting section may determine that the foreign matter is present when the amount of change exceeds a predetermined threshold value. This produces an effect of determining that the foreign matter is present when the amount of change exceeds the threshold value.

In addition, in the first embodiment, the impedance may include a resistance of the power receiving coil, and the foreign matter detecting section may generate an eddy-current loss of the foreign matter from an amount of change in the resistance and the induced current, and determine that the foreign matter is present when the eddy-current loss exceeds a predetermined threshold value. This produces an effect of determining that the foreign matter is present when the eddy-current loss exceeds the threshold value.

According to a second embodiment of the present technology, there is provided a power feeding system including: a power feeding device configured to supply power via a magnetic field; and a power receiving device configured to include a power receiving coil for receiving the power, an alternating-current power supply for applying an alternating voltage to the power receiving coil, and a foreign matter detecting section configured to generate an amount of change in impedance of the power receiving coil from a current induced in the power receiving coil to which the alternating voltage is applied and the alternating voltage, and detect foreign matter between the power receiving coil and the power feeding device on a basis of the amount of change. This produces an effect of detecting the foreign matter on the basis of the amount of change in impedance of the power receiving coil.

According to the present technology, an excellent effect of a power receiving device being able to detect foreign matter correctly can be produced.

BRIEF DESCRIPTION OF THE DRAWINGS

FIG. 7 is a diagram showing an example of operation of a power feeding device control portion and an alternating-current power supply control portion in the first embodiment;

DETAILED DESCRIPTION OF THE PREFERRED EMBODIMENTS

A mode for carrying out the present technology (which mode will hereinafter be referred to as embodiments) will hereinafter be described. Description will be made in the following order.

1. First Embodiment (Example of Detecting Foreign Matter on the Basis of Amount of Change in Resistance and Inductance of Power Receiving Coil)
2. Second Embodiment (Example of Detecting Foreign Matter on the Basis of Amount of Change in Resistance of Power Receiving Coil)
3. Third Embodiment (Example of Detecting Foreign Matter and Calculating Amount of Control on the Basis of Amount of Change in Resistance of Power Receiving Coil)

1. First Embodiment

Example of Configuration of Noncontact Power Feeding System

Figure 1:
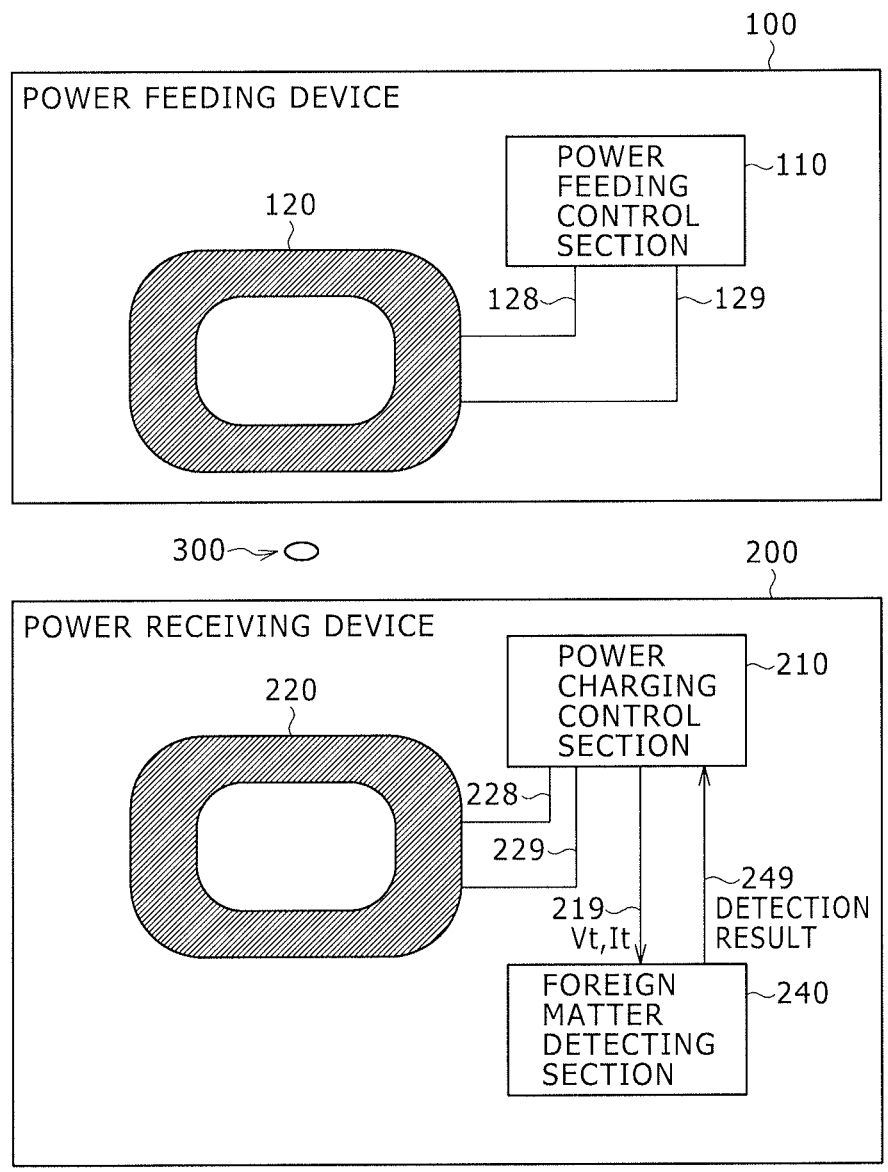
FIG. 1 is a general view of an example of configuration of a power feeding system in a first embodiment.

FIG. 1 is a general view of an example of configuration of a noncontact power feeding system in an embodiment. This noncontact power feeding system is a system for supplying power to a device in an electrically noncontact state. The noncontact power feeding system includes a power feeding device 100 and a power receiving device 200.

The power feeding device 100 supplies alternating-current power to the power receiving device 200 by electromagnetic wave. This power feeding device 100 includes a power feeding control section 110 and a power feeding coil 120.

The power feeding control section 110 controls an amount of power supplied to the power receiving device 200. The power feeding control section 110 supplies alternating-current power to the power feeding coil 120 via signal lines 128 and 129, and controls the amount of the power. In addition, the power feeding control section 110 receives a control signal for controlling an amount of fed power from the power receiving device 200. When the power feeding control section 110 has received the control signal, the power feeding control section 110 controls the amount of fed power according to the control signal. This control signal includes for example a control signal for stopping power feeding.

When the power feeding coil 120 is supplied with power by the power feeding control section 110, the power feeding coil 120 generates an electromagnetic wave according to Ampere's law. The power receiving device 200 is supplied with alternating-current power via this electromagnetic wave.

The power receiving device 200 receives the power supplied by the electromagnetic wave. The power receiving device 200 includes a charging control section 210, a power receiving coil 220, and a foreign matter detecting section 240.

The charging control section 210 charges a secondary battery or the like with the power received from the power receiving coil 220 via wiring 228 and 229, and controls a current and a voltage in the charging. Specifically, the charging control section 210 converts the received alternating-current power into a direct current. Then, the charging control section 210 controls the voltage and the current on the basis of the characteristics of the secondary battery, a charging time, and the like.

The charging control section 210 makes the power feeding stopped by transmitting a control signal to stop the power feeding to the power feeding device 100 at a time of a start of a monitoring period, which is a period in which to detect foreign matter. After the power feeding is stopped, the charging control section 210 applies an alternating voltage $V_t$ to the power receiving coil 220, and supplies measured values of a current $I_t$ generated in the power receiving coil 220 by the application of the alternating voltage $V_t$ and the alternating voltage $V_t$ to the foreign matter detecting section 240 via a signal line 219. The charging control section 210 then receives a detection result as a result of determining whether foreign matter is present or not between the power feeding device 100 and the power receiving device 200 from the foreign matter detecting section 240.

The charging control section 210 stops the application of the alternating voltage $V_t$ after the passage of the monitoring period. After stopping the application of the alternating voltage $V_t$, the charging control section 210 makes the power feeding resumed by transmitting a control signal to make the power feeding started to the power feeding device 100. However, when foreign matter is present, the charging control section 210 stops or decreases the charging current. When the foreign matter cannot be dealt with by controlling the charging current (for example when the charging current cannot be decreased any further), the charging control section 210 does not transmit the control signal to the power feeding device 100. This prevents the power feeding from being resumed. Incidentally, when foreign matter is detected, after the passage of the monitoring period, the charging control section 210 can also transmit a control signal to start feeding an amount of power smaller by a certain amount than before the stopping of the power feeding. This makes the power feeding continued even when foreign matter is detected.

The power receiving coil 220 is disposed at a position where when the power receiving coil 220 is supplied with the electromagnetic wave from the power feeding coil 120, an induced voltage corresponding to a change in the magnetic flux of the electromagnetic wave is induced according to a law of electromagnetic induction.

The foreign matter detecting section 240 obtains an amount of change in impedance of the power receiving coil 220 from the alternating voltage $V_t$ and the current $I_t$, and detects foreign matter on the basis of the amount of change. The foreign matter detecting section 240 outputs a detection result of detecting whether or not foreign matter is present to the charging control section 210 via a signal line 249.

Figure 2:
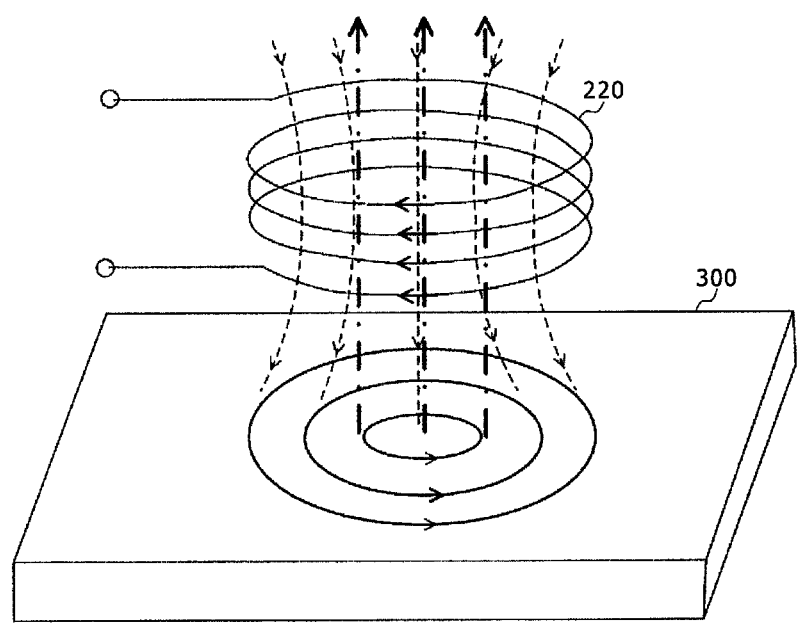
FIG. 2 is a diagram of assistance in explaining a cause of a change in parameter in a power receiving coil in the first embodiment.

FIG. 2 is a diagram of assistance in explaining a cause of a change in parameter in the power receiving coil 220 in the first embodiment. Suppose that there is conductive foreign matter 300 such as a metal or the like in the electromagnetic field generated by the power receiving coil 220. When the electromagnetic field changes, an eddy current occurs in the foreign matter 300 due to an effect of electromagnetic induction. The foreign matter generates heat due to a Joule heat caused by the eddy current. In addition, a magnetic field generated by the eddy current acts on the power receiving coil 220, changing a resistance and a reactance in an equivalent circuit of the power receiving coil 220. The power receiving device 200 can therefore determine whether or not foreign matter is present from an amount of change in the resistance and the reactance in the power receiving coil 220. In FIG. 2, dotted line arrows represent the magnetic field generated by the power receiving coil 220. Solid line arrows represent the eddy current. Arrows of alternate long and short dashed lines represent the magnetic field generated by the eddy current.

Figure 3:
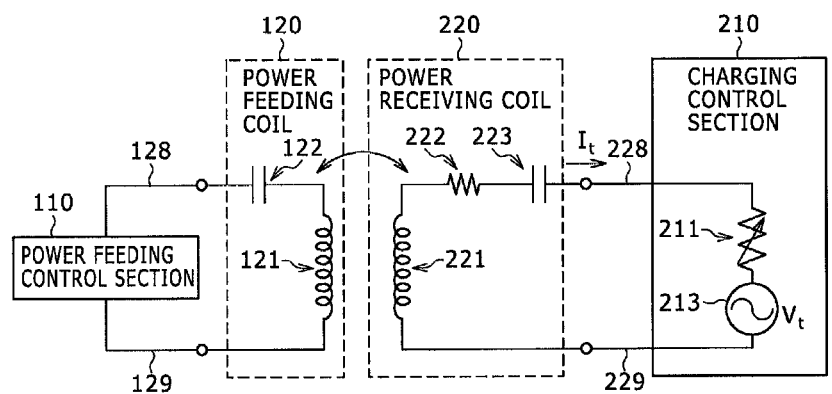
FIG. 3 is a circuit diagram showing an example of an equivalent circuit of the noncontact power feeding system in the first embodiment.

FIG. 3 is a circuit diagram showing an example of an equivalent circuit of the noncontact power feeding system in the first embodiment. The power feeding coil 120 can be replaced by an equivalent circuit including a primary inductance ($L_1$) 121 and a primary capacitance ($C_1$) 122. The power receiving coil 220 can be replaced by an equivalent circuit including a secondary inductance ($L_2$) 221, a secondary resistance ($r_2$) 222, and a secondary capacitance ($C_2$) 223. The charging control section 210 can be replaced by an equivalent circuit including a load resistance ($R_2$) 211. A rectifier is omitted in the charging control section 210. In addition, an alternating-current power supply 213 is inserted within the charging control section 210 in the monitoring period. As described above, when foreign matter is present, at least one of the secondary resistance $r_2$ and the secondary inductance $L_2$ changes in the equivalent circuit of the power receiving coil 220. Thus, the foreign matter is detected from an amount of change in the secondary resistance $r_2$ and the secondary inductance $L_2$. Incidentally, the resistance of the power feeding coil 120 is omitted in the equivalent circuit.

[Example of Configuration of Power Feeding Control Section]

Figure 4:
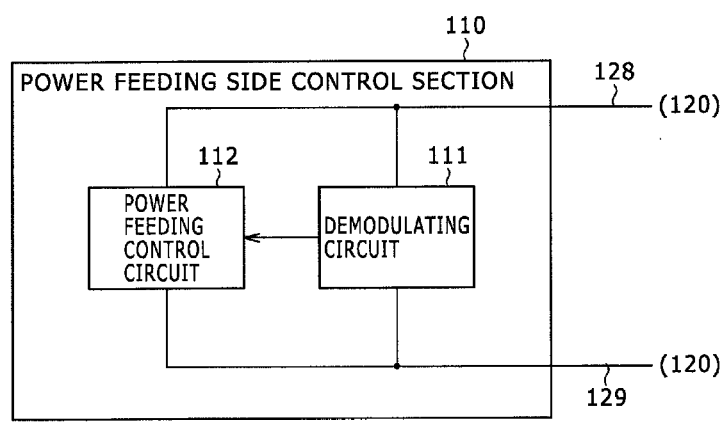
FIG. 4 is a block diagram showing an example of configuration of a power feeding control section in the first embodiment.

FIG. 4 is a block diagram showing an example of configuration of the power feeding control section 110 in the first embodiment. The power feeding control section 110 includes a demodulating circuit 111 and a power feeding control circuit 112.

The demodulating circuit 111 demodulates an alternating-current signal from the power receiving device 200, and extracts a control signal superimposed on the alternating-current signal. The demodulating circuit 111 outputs the control signal to the power feeding control circuit 112. The power feeding control circuit 112 controls the amount of power supplied to the power receiving device 200 according to the control signal.

[Example of Configuration of Charging Control Section]

Figure 5:
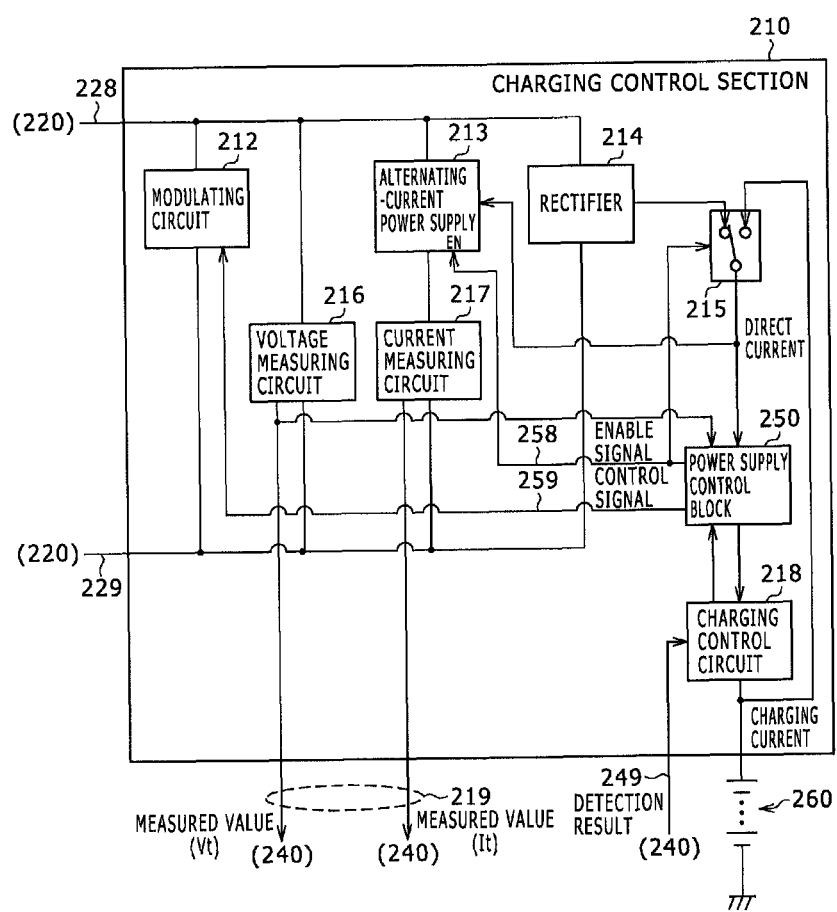
FIG. 5 is a block diagram showing an example of configuration of a charging control section in the first embodiment.

FIG. 5 is a block diagram showing an example of configuration of the charging control section 210 in the first embodiment. The charging control section 210 includes a modulating circuit 212, an alternating-current power supply 213, a rectifier 214, a switch 215, a voltage measuring circuit 216, a current measuring circuit 217, a charging control circuit 218, and a power supply control block 250. In addition, when a secondary battery 260 is mounted in the power receiving device 200, the charging control section 210 is connected to the secondary battery 260. Incidentally, the secondary battery 260 may be a built-in battery incorporated in the power receiving device 200.

The modulating circuit 212 superimposes the control signal by modulating the amplitude or the like of the alternating-current signal for the power feeding device 100. Incidentally, the modulating circuit 212 is an example of a transmitting circuit described in claims.

The alternating-current power supply 213 converts direct-current power from the secondary battery 260 into an alternating current, and supplies the alternating current to the power receiving coil 220, under control of the power supply control block 250. In supplying the alternating-current power, the frequency and amplitude of the alternating voltage are desirably a constant value. An inverter, for example, is used as the alternating-current power supply 213. The alternating-current power supply 213 has an input terminal, an output terminal, and an enable terminal EN. The input terminal is connected to the secondary battery 260 via the switch 215. The output terminal is connected to the power receiving coil 220. The enable terminal EN is connected to the power supply control block 250. An enable signal for enabling or disabling the alternating-current power supply 213 is input to the enable terminal EN. When the alternating-current power supply 213 is made to supply the alternating-current power (enabled), the enable signal is for example set to a high level. When the alternating-current power supply 213 is not made to supply the alternating-current power (disabled), on the other hand, the enable signal is for example set to a low level. When the alternating-current power supply 213 is disabled, the impedance of the alternating-current power supply 213 is raised to such an extent that current does not flow in a reverse direction from the output terminal to the inside of the alternating-current power supply 213.

The rectifier 214 converts alternating-current power from the power feeding device 100 into a direct current, and supplies the direct current to the charging control circuit 218 via the switch 215.

The switch 215 changes a source of supply of direct-current power to the power supply control block 250 and the alternating-current power supply 213 under control of the power supply control block 250. The switch 215 has two input terminals, one output terminal, and a control terminal. One of the input terminals is connected to the rectifier 214. The other input terminal is connected to a terminal on a high potential side of the secondary battery 260. The output terminal is connected to the power supply control block 250 and the alternating-current power supply 213. The enable signal is input to the control terminal. The switch 215 for example changes the source of supply of direct-current power to the rectifier 214 when the input enable signal is at a low level, and changes the source of supply of direct-current power to the secondary battery 260 when the input enable signal is at a high level.

The voltage measuring circuit 216 measures the alternating voltage $V_t$ applied by the alternating-current power supply 213. The voltage measuring circuit 216 subjects the measured value to A/D (Analog to Digital) conversion as required, and supplies the measured value to the foreign matter detecting section 240 and the power supply control block 250. The current measuring circuit 217 measures the alternating current $I_t$ produced in the power receiving coil 220 by the alternating voltage $V_t$. The current measuring circuit 217 subjects the measured value to A/D conversion as required, and supplies the measured value to the foreign matter detecting section 240 and the power supply control block 250. Incidentally, the current measuring circuit 217 can also measure the current of a direct-current circuit inserted in series with the charging control section 210 in place of the alternating current.

The charging control circuit 218 controls the voltage and the current of the converted direct-current power, and charges the secondary battery 260. Specifically, the charging control circuit 218 controls the voltage to a constant level by using a regulator or the like, and controls the current according to the charging time. For example, the charging control circuit 218 increases or decreases the charging current depending on whether or not a quick charging mode, in which charging is to be completed in a short time, is set. In addition, the charging control circuit 218 controls (for example stops) the supply of the charging current to the secondary battery 260 or the like when foreign matter is detected. A decrease in the charging current suppresses a rise in temperature of the foreign matter due to a magnetic field from the power receiving device 200. In this case, the power receiving device 200 may transmit a result of control of the charging current to the power feeding device 100 when foreign matter is detected.

The power supply control block 250 controls the power feeding device 100 and the alternating-current power supply 213 on the basis of a foreign matter detection result. The power supply control block 250 controls the power feeding device 100 by transmitting a control signal to the power feeding device 100 via the modulating circuit 212. The power supply control block 250 also controls the alternating-current power supply 213 and the switch 215 by outputting the enable signal to the alternating-current power supply 213 and the switch 215. Details of the operation of the power supply control block 250 will be described later.

Incidentally, while the charging control section 210 measures the amplitude and phase of the alternating voltage $V_t$ by the voltage measuring circuit 216, the charging control section 210 may be configured to measure only the phase of the alternating voltage $V_t$ when the amplitude of the alternating voltage $V_t$ is constant in a monitoring period. In this case, it suffices to set the amplitude value of the alternating voltage $V_t$ in the foreign matter detecting section 240 in advance, and it suffices for the foreign matter detecting section 240 to detect foreign matter using the amplitude value and the measured phase.

Figure 6:
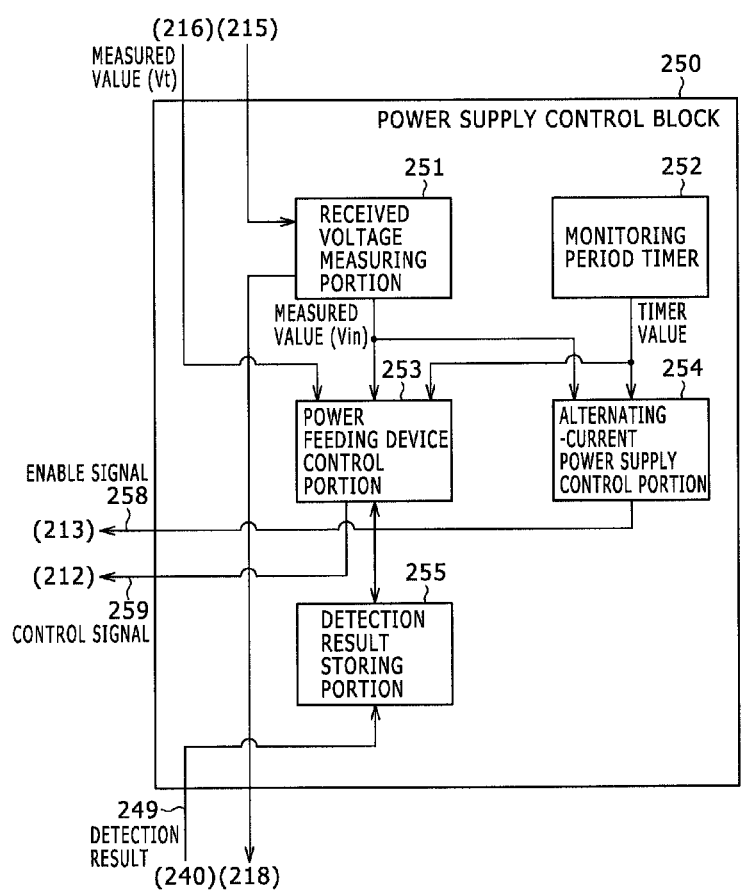
FIG. 6 is a block diagram showing an example of configuration of a power supply control block in the first embodiment.

FIG. 6 is a block diagram showing an example of configuration of the power supply control block 250 in the first embodiment. The power supply control block 250 includes a received voltage measuring portion 251, a monitoring period timer 252, a power feeding device control portion 253, an alternating-current power supply control portion 254, and a detection result storing portion 255.

The received voltage measuring portion 251 measures the voltage of the power converted into direct current by the rectifier 214 as a received voltage Vin. The received voltage measuring portion 251 subjects the measured value to A/D conversion as required, and supplies the measured value to the power feeding device control portion 253 and the alternating-current power supply control portion 254.

The monitoring period timer 252 repeatedly clocks a power feeding period and a monitoring period alternately. The power feeding period is a period for controlling the power feeding device 100 to make the power feeding device 100 supply alternating-current power to the power receiving device 200. The monitoring period is a period for detecting foreign matter. The monitoring period timer 252 supplies a timer value to the power feeding device control portion 253 and the alternating-current power supply control portion 254.

The power feeding device control portion 253 controls the power feeding device 100 to make the power feeding device 100 supply alternating-current power to the power receiving device 200. When the timer value is a value within a monitoring period, the power feeding device control portion 253 generates a control signal to stop power feeding, and transmits the control signal to the power feeding device 100 via the modulating circuit 212. In addition, the power feeding device control portion 253 makes the detection result storing portion 255 retain a detection result in some timing within a monitoring period (for example at a time of an end of a monitoring period).

When the timer value is a value within a power feeding period, on the other hand, the power feeding device control portion 253 obtains the measured value of the alternating voltage $V_t$, and reads a detection result from the detection result storing portion 255. The power feeding device control portion 253 then determines whether or not the application of the alternating voltage $V_t$ is stopped on the basis of whether or not the alternating voltage $V_t$ is equal to or lower than a predetermined value. When the application of the alternating voltage $V_t$ is stopped, the power feeding device control portion 253 generates a control signal to start power feeding, and transmits the control signal to the power feeding device 100. However, when foreign matter is detected and cannot be dealt with by control of the charging current by the charging control circuit 218 (for example when the charging current cannot be decreased any further), the power feeding device control portion 253 does not generate a control signal to start power feeding nor transmit the control signal to the power feeding device 100. After power feeding is started, the power feeding device control portion 253 transmits a control signal to control the amount of fed power on the basis of the value of the received voltage Vin until a monitoring period is started. For example, the power feeding device control portion 253 transmits a control signal to increase or decrease the amount of fed power so that the received voltage Vin falls within a certain range.

Incidentally, the timing of retaining a detection result is not limited to an end of a monitoring period. The timing may be any timing as long as the timing is in a period from the returning of a detection result by the foreign matter detecting section 240 in response to the application of the alternating voltage $V_t$ to an end of the monitoring period. In addition, while the power feeding device control portion 253 determines whether or not the application of the alternating voltage $V_t$ is stopped on the basis of the measured value of the alternating voltage $V_t$, the power feeding device control portion 253 can also determine that the application of the alternating voltage $V_t$ is stopped by another method. For example, the power feeding device control portion 253 can also determine that the application of the alternating voltage $V_t$ is stopped when a certain period has passed from an end of a monitoring period.

The alternating-current power supply control portion 254 controls the alternating-current power supply 213 to make the alternating-current power supply 213 apply the alternating voltage $V_t$. The alternating-current power supply control portion 254 obtains the measured value of the received voltage Vin when the timer value is a value within a monitoring period. The alternating-current power supply control portion 254 then determines whether or not power feeding is stopped on the basis of whether or not the received voltage Vin is equal to or lower than a predetermined value. When the power feeding is stopped, the alternating-current power supply control portion 254 sets the enable signal to a high level to make the alternating-current power supply 213 apply the alternating voltage $V_t$. When the timer value is a value within a power feeding period, on the other hand, the alternating-current power supply control portion 254 sets the enable signal to a low level to make the application of the alternating voltage $V_t$ stopped.

Incidentally, while the alternating-current power supply control portion 254 determines whether or not power feeding is stopped on the basis of the measured value of the alternating voltage $V_t$, the alternating-current power supply control portion 254 can also determine that power feeding is stopped by another method. For example, the alternating-current power supply control portion 254 can also determine that power feeding is stopped when a certain period has passed from a start of a monitoring period.

The detection result storing portion 255 retains a foreign matter detection result under control of the power feeding device control portion 253.

FIG. 7 is a diagram showing an example of the operation of the power feeding device control portion 253 and the alternating-current power supply control portion 254 in the first embodiment. Suppose that the monitoring period timer 252 repeatedly clocks a timer value T from 0 to Te. In addition, suppose that a period in which the timer value T is 0 to Ts−1 (Ts is a value greater than 0 and less than Te) is a power feeding period, and that a period of Ts to Te is a monitoring period.

In the power feeding period, after the application of the alternating voltage $V_t$ is stopped, the power feeding device control portion 253 controls the power feeding device 100 by a control signal to make the power feeding device 100 start power feeding. However, when foreign matter is detected and cannot be dealt with by control of the charging current by the charging control circuit 218, the power feeding device control portion 253 does not generate a control signal to start power feeding nor transmit the control signal to the power feeding device 100. After power feeding is started, the power feeding device control portion 253 controls the amount of fed power on the basis of the value of the received voltage Vin. At a time of a start of the monitoring period (T=Ts), the power feeding device control portion 253 controls the power feeding device 100 to make the power feeding stopped.

In the monitoring period, on the other hand, after the power feeding is stopped, the alternating-current power supply control portion 254 sets the enable signal to a high level to make the application of the alternating voltage $V_t$ started. Then, at a time of an end of the monitoring period (T=Te), the alternating-current power supply control portion 254 sets the enable signal to a low level to make the application of the alternating voltage $V_t$ stopped.

Incidentally, while the power supply control block 250 is configured to make the application of the alternating voltage $V_t$ started each time a monitoring period is started even after foreign matter is detected, the power supply control block 250 can also be configured not to make the alternating voltage $V_t$ applied after foreign matter is detected. Alternatively, the power supply control block 250 may be configured to decrease monitoring frequency when foreign matter is detected.

In addition, while a power feeding period is started first, a monitoring period may be started first. In addition, the power supply control block 250 is configured to clock a monitoring period repeatedly, the power supply control block 250 may be configured to clock a monitoring period only once. In this configuration, it suffices for the power supply control block 250 to keep power feeding stopped when there is foreign matter, and make power feeding resumed when there is no foreign matter.

In addition, as long as power feeding can be controlled, the control signal is not limited to a signal for starting or ending power feeding. For example, the power receiving device 200 may transmit a control signal for stopping power feeding for a certain period or a control signal for cancelling the resumption of power feeding. In this configuration, it suffices for the power receiving device 200 to transmit the control signal for stopping power feeding for a certain period at a time of a start of a monitoring period, and to transmit the control signal for cancelling the resumption of power feeding when there is foreign matter.

Further, while the power receiving device 200 is configured to control the power feeding device 100, the power feeding device 100 may be configured to control the power receiving device 200. In this configuration, the power feeding device 100 includes a monitoring period timer, stops power feeding at the time of a start of a monitoring period, and thereafter transmits a control signal for giving an instruction to start the application of the alternating voltage $V_t$ to the power receiving device 200. The power receiving device 200 then transmits a signal indicating a result of foreign matter detection to the power feeding device 100 in the monitoring period. At the time of an end of the monitoring period, the power feeding device 100 transmits a control signal for giving an instruction to stop the application of the alternating voltage $V_t$ to the power receiving device 200. The power feeding device 100 starts power feeding in a power feeding period when there is no foreign matter, or does not start power feeding when there is foreign matter.

Figure 8:
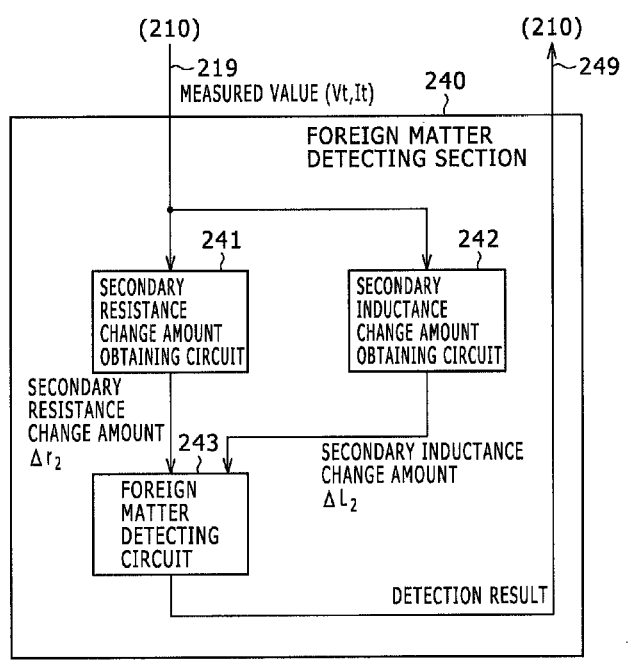
FIG. 8 is a block diagram showing an example of configuration of a foreign matter detecting section in the first embodiment.

FIG. 8 is a block diagram showing an example of configuration of the foreign matter detecting section 240 in the first embodiment. The foreign matter detecting section 240 includes a secondary resistance change amount obtaining circuit 241, a secondary inductance change amount obtaining circuit 242, and a foreign matter detecting circuit 243.

The secondary resistance change amount obtaining circuit 241 obtains an amount of change in resistance of the power receiving coil 220 as an amount of change $\Delta r_2$ in the secondary resistance from the measured values of the alternating voltage $V_t$ and the current $I_t$. The secondary resistance change amount obtaining circuit 241 calculates the secondary resistance $r_2$ using the following Equation 1, for example.

$$r_2 = Re(\dot{V}_t/\dot{I}_t) - R_2 \qquad \text{Equation 1}$$

In Equation 1, "Re( )" is a function that returns the real part of a complex number in the parentheses. A voltage V or a current I having a dot attached to an upper part thereof denotes an alternating voltage or an alternating current represented by a complex number. $R_2$ is the load resistance of a load in the charging control section 210. The unit of $R_2$ is for example an ohm ($\Omega$). A method for deriving Equation 1 will be described later.

The secondary resistance change amount obtaining circuit 241 calculates the amount of change $\Delta r_2$ in the secondary resistance from the calculated secondary resistance $r_2$ using the following Equation 2. The secondary resistance change amount obtaining circuit 241 outputs the calculated amount of change $\Delta r_2$ to the foreign matter detecting circuit 243.

$$\Delta r_2 = r_2 - r_0 \qquad \text{Equation 2}$$

In Equation 2, $r_0$ is an original secondary resistance of the power receiving coil 220 measured when there is no foreign matter.

The secondary inductance change amount obtaining circuit 242 obtains an amount of change in the inductance in the equivalent circuit of the power receiving coil 220 as an amount of change $\Delta L_2$ in the secondary inductance from the measured values of the alternating voltage $V_t$ and the current $I_t$. The secondary inductance change amount obtaining circuit 242 calculates the secondary inductance $L_2$ using the following Equation 3, for example.

$$L_2 = \frac{1}{\omega}\left\{I_m(\dot{V}_t/\dot{I}_t) + \frac{1}{(\omega C_2)}\right\} \qquad \text{Equation 3}$$

In Equation 3, "Im( )" is a function that returns the imaginary part of a complex number in the parentheses. $\omega$ is an angular frequency. The unit of $\omega$ is a radian/second (rad/s). $C_2$ is the capacitance in the equivalent circuit of the power receiving coil 220. The unit of $C_2$ is a farad (F), for example. A method for deriving Equation 3 will be described later.

The secondary inductance change amount obtaining circuit 242 calculates the amount of change $\Delta L_2$ in the secondary inductance from the calculated secondary inductance $L_2$ using the following Equation 4. The secondary inductance change amount obtaining circuit 242 outputs the calculated amount of change $\Delta L_2$ to the foreign matter detecting circuit 243.

$$\Delta L_2 = L_2 - L_0 \qquad \text{Equation 4}$$

In this Equation 4, $L_0$ is an original inductance of the power receiving coil 220 measured when there is no foreign matter.

A method for deriving Equation 1 and Equation 3 will be described in the following. An impedance Z in the equivalent circuit of the power receiving device 200 illustrated in FIG. 3 is obtained from the following Equation 5.

$$\dot{Z} = \left\{ j\omega L_2 + r_2 + R_2 \frac{1}{(j\omega C_2)} \right\} \quad \text{Equation 5}$$

When the alternating voltage $V_t$ is applied, the following Equation 6 is obtained from Equation 5 and the current $I_t$.

$$\dot{V}_t = \dot{Z} \cdot \dot{I}_t = \left\{ j\omega L_2 + r_2 + R_2 \frac{1}{(j\omega C_2)} \right\} \quad \text{Equation 6}$$

Equation 1 is derived by obtaining the real parts of both sides of Equation 6. In addition, Equation 3 is derived by obtaining the imaginary parts of both sides of Equation 6.

The foreign matter detecting circuit 243 detects whether foreign matter is present or not from the amount of change $\Delta r_2$ in the secondary resistance and the amount of change $\Delta L_2$ in the secondary inductance. For example, the foreign matter detecting circuit 243 compares the amount of change $\Delta r_2$ and the amount of change $\Delta L_2$ with threshold values Th1 and Th2. The threshold value Th1 is a threshold value to be compared with the amount of change $\Delta r_2$. The threshold value Th2 is a threshold value to be compared with the amount of change $\Delta L_2$. Then, the foreign matter detecting circuit 243 determines that foreign matter is present when the amount of change $\Delta r_2$ is equal to or larger than the threshold value Th1 or the amount of change $\Delta L_2$ is equal to or larger than the threshold value Th2, for example. The foreign matter detecting circuit 243 outputs a result of the foreign matter detection to the charging control section 210.

Incidentally, the foreign matter detecting section 240 may determine that foreign matter is present when the amount of change $\Delta r_2$ is equal to or larger than the threshold value Th1 and the amount of change $\Delta L_2$ is equal to or larger than the threshold value Th2. In addition, as will be described later in a second embodiment, the foreign matter detecting section 240 may determine that foreign matter is present when the amount of change $\Delta r_2$ is equal to or larger than the threshold value without obtaining the amount of change $\Delta L_2$. Alternatively, the foreign matter detecting section 240 may determine that foreign matter is present when the amount of change $\Delta L_2$ is equal to or larger than the threshold value without obtaining the amount of change $\Delta r_2$. Alternatively, the foreign matter detecting section 240 may determine that foreign matter is present when an addition value obtained by adding together the amount of change $\Delta r_2$ and an amount of change $\Delta \omega L_2$ is equal to or larger than a threshold value.

The values of the amount of change $\Delta r_2$ and the amount of change $\Delta L_2$ in relation to the supplied voltage differ depending on the size and physical properties of the foreign matter. The kind of the substance is therefore identified by these values. The temperature of the foreign matter rises according to an increase in the amount of change $\Delta r_2$, in particular. Thus, the rise in the temperature is suppressed by controlling the received current such that the temperature is lower than a certain value.

[Example of Operation of Power Feeding Device]

Figure 9:
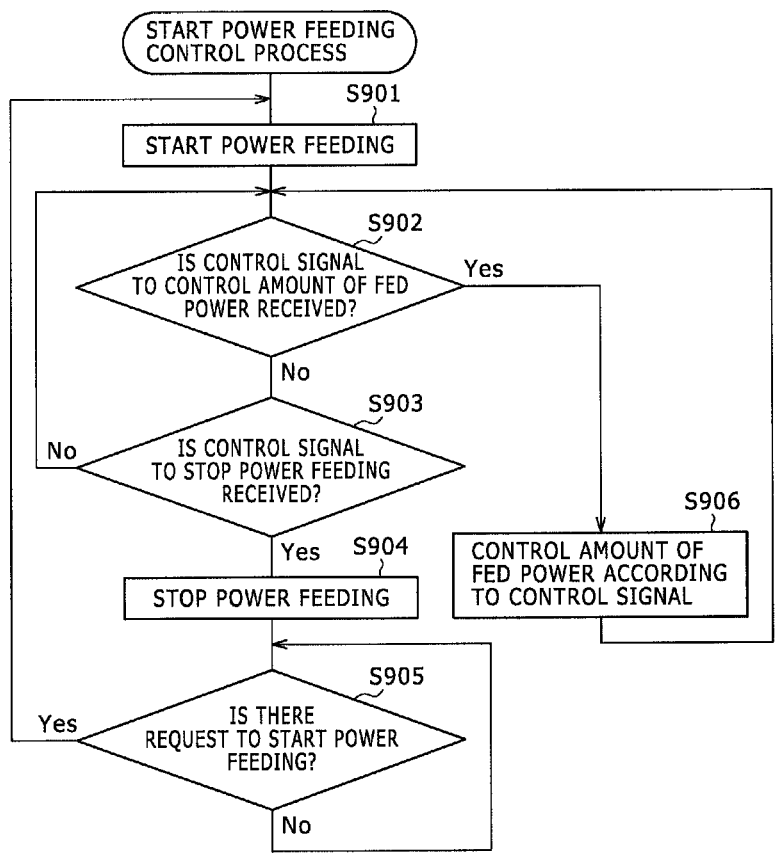
FIG. 9 is a flowchart of an example of a power feeding control process in the first embodiment.

FIG. 9 is a flowchart of an example of a power feeding control process in the first embodiment. This power feeding control process is started when the power feeding device 100 is turned on, for example.

The power feeding device 100 starts feeding alternating-current power (step S901). The power feeding device 100 then determines whether or not a control signal to control an amount of fed power is received (step S902). When the control signal to control the amount of fed power is received (step S902: Yes) (step S906), the power feeding device 100 returns to step S902. When the control signal to control the amount of fed power is not received (step S902: No), the power feeding device 100 determines whether or not a control signal to stop the power feeding is received (step S903). When the control signal to stop the power feeding is not received (step S903: No), the power feeding device 100 returns to step S902. When the control signal to stop the power feeding is received (step S903: Yes), the power feeding device 100 stops the power feeding (step S904).

After stopping the power feeding, the power feeding device 100 determines whether or not a control signal to start power feeding is received (step S905). When the control signal to start power feeding is not received (step S905: No), the power feeding device 100 returns to step S905. When the control signal to start power feeding is received (step S905: Yes), the power feeding device 100 returns to step S901.

[Example of Operation of Power Receiving Device]

Figure 10:
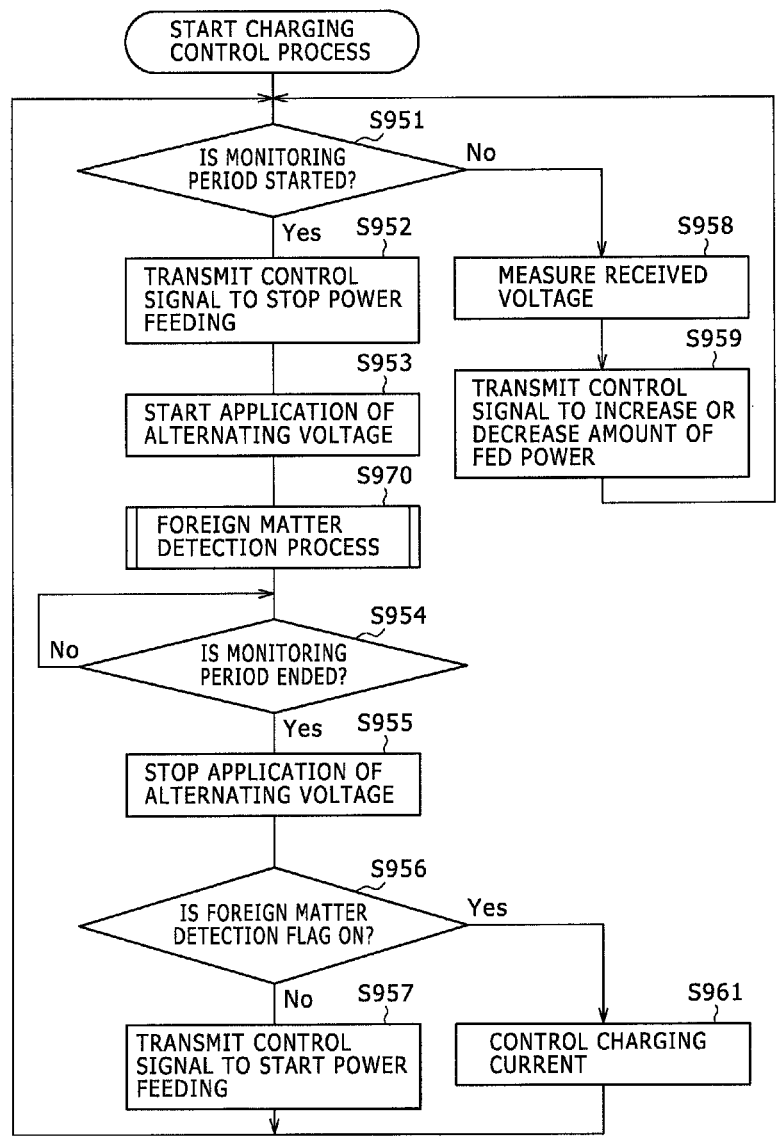
FIG. 10 is a flowchart of an example of a charging control process in the first embodiment.

FIG. 10 is a flowchart of an example of a charging control process in the first embodiment. This charging control process is started by the power receiving device 200 when power supply from the power feeding device 100 is started, for example.

The power receiving device 200 determines whether or not a monitoring period is started (step S951). When a monitoring period is started (step S951: Yes), the power receiving device 200 transmits a control signal to stop power feeding to the power feeding device 100 (step S952). Then, after the power feeding is stopped, the power receiving device 200 starts to apply the alternating voltage $V_t$ to the power receiving coil 220 (step S953). The power receiving device 200 performs a foreign matter detection process for detecting foreign matter (step S970).

The power receiving device 200 determines whether or not the monitoring period is ended (step S954). When the monitoring period is not ended (step S954: No), the power receiving device 200 returns to step S954. When the monitoring period is ended (step S954: Yes), on the other hand, the power receiving device 200 stops the application of the alternating voltage $V_t$ to the power receiving coil 220 (step S955). The power receiving device 200 determines whether or not a foreign matter detection flag is on (step S956). The foreign matter detection flag is a variable indicating a result of foreign matter detection. For example, the foreign matter detection flag is set in an on state when foreign matter is detected, and the foreign matter detection flag is set in an off state when no foreign matter is detected. When the foreign matter detection flag is off (step S956: No), the power receiving device 200 transmits a control signal to start power feeding to the power feeding device 100 (step S957). When the foreign matter detection flag is on (step S956: Yes), the power receiving device 200 controls the charging current. Then, the power receiving device 200 transmits a control signal as required (step S961). After step S961 or step S957, the power receiving device 200 returns to step S951.

When the monitoring period is not started (step S951: No), the power receiving device 200 measures the received voltage Vin (step S958). The power receiving device 200 then transmits a control signal to increase or decrease the amount of fed power on the basis of the received voltage Vin to the power feeding device 100 (step S959). After step S959, the power receiving device 200 returns to step S951.

Figure 11:
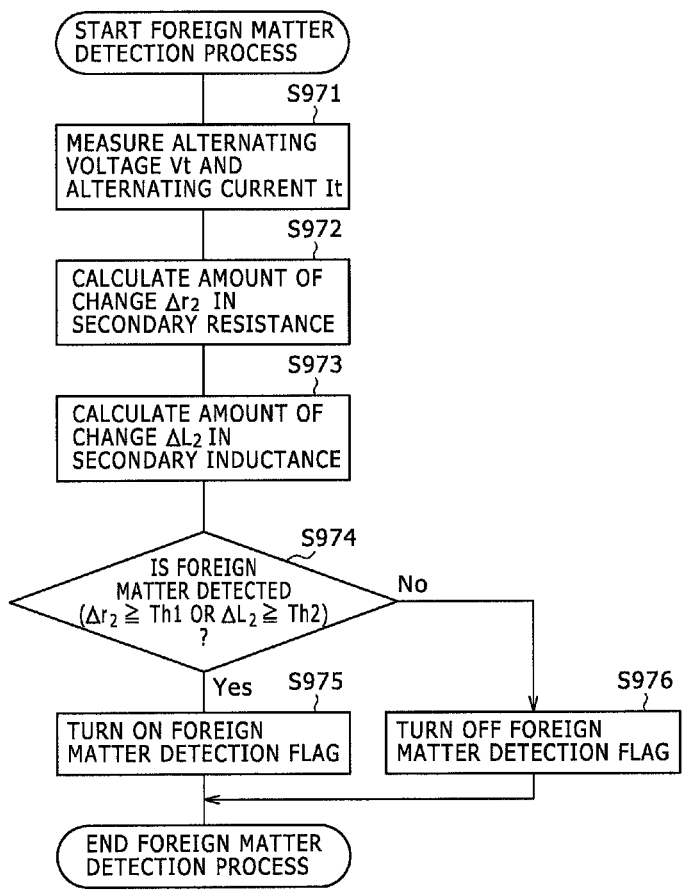
FIG. 11 is a flowchart of an example of a foreign matter detection process in the first embodiment.

FIG. 11 is a flowchart of an example of a foreign matter detection process in the first embodiment. The power receiving device 200 measures the alternating voltage $V_t$ and the current $I_t$ (step S971). The power receiving device 200 calculates the amount of change $\Delta r_2$ in the secondary resistance by substituting the alternating voltage $V_t$ and the current $I_t$ into Equation 1 and Equation 2 (step S972). The power receiving device 200 also calculates the amount of change $\Delta L_2$ in the secondary inductance by substituting the alternating voltage $V_t$ and the current $I_t$ into Equation 3 and Equation 4 (step S973).

The power receiving device 200 determines whether or not foreign matter is detected on the basis of whether or not the amount of change $\Delta r_2$ is equal to or larger than the threshold value Th1 or the amount of change $\Delta L_2$ is equal to or larger than the threshold value Th2 (step S974). When foreign matter is detected (step S974: Yes), the power receiving device 200 turns on the foreign matter detection flag (step S975). When no foreign matter is detected (step S974: No), the power receiving device 200 turns off the foreign matter detection flag (step S976). After step S975 or S976, the power receiving device 200 ends the foreign matter detection process.

Figure 12:
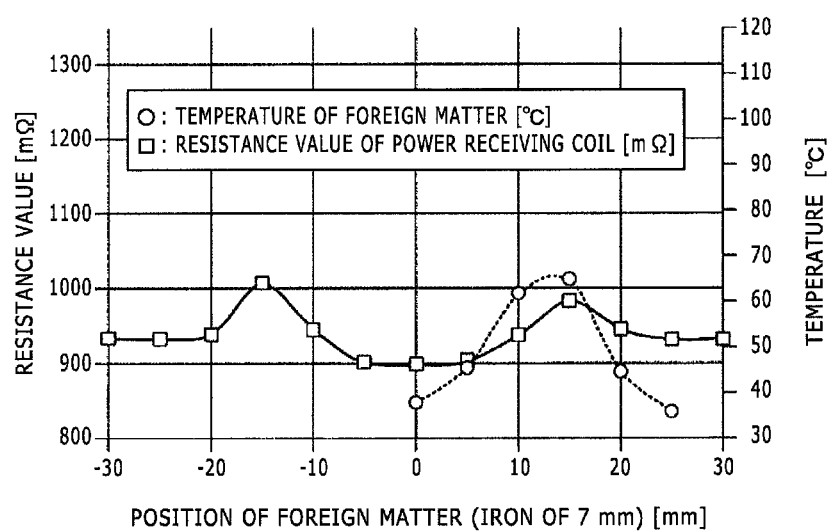
FIG. 12 is a graph showing an example of relation between the temperature of an iron of 7 mm and the resistance value of the power receiving coil in the first embodiment.
Figure 13:
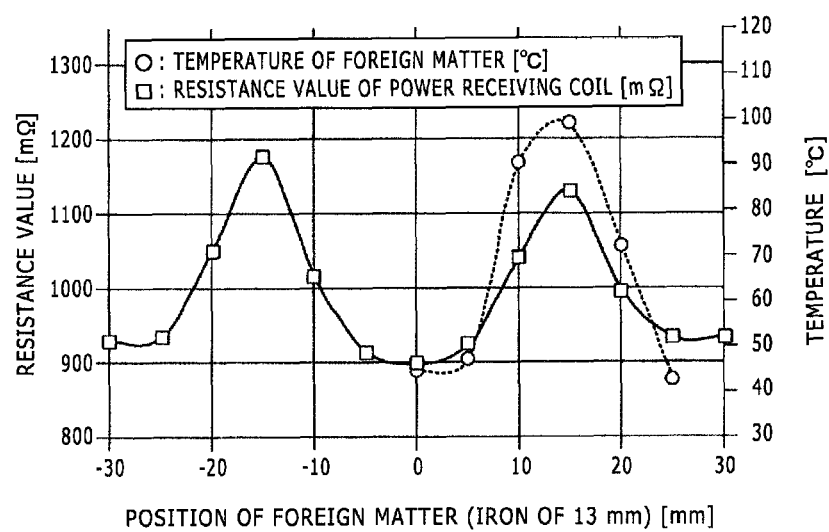
FIG. 13 is a graph showing an example of relation between the temperature of an iron of 13 mm and the resistance value of the power receiving coil in the first embodiment.
Figure 14:
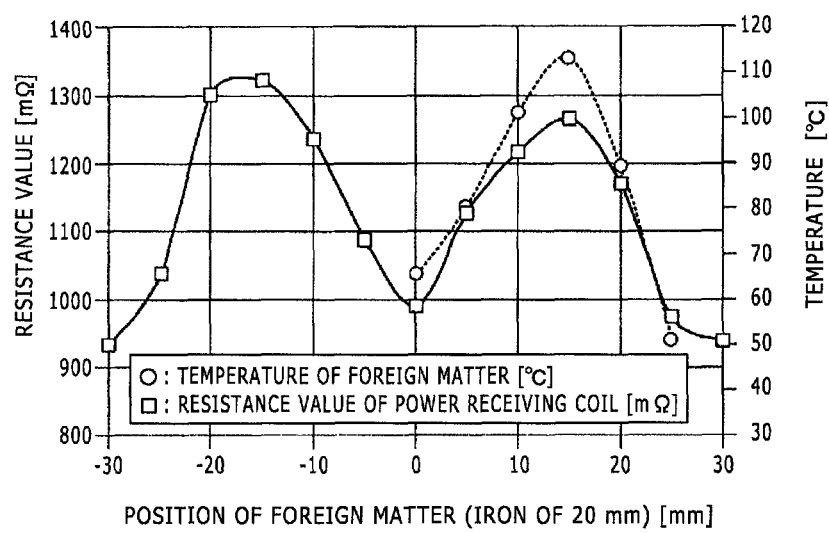
FIG. 14 is a graph showing an example of relation between the temperature of an iron of 20 mm and the resistance value of the power receiving coil in the first embodiment.

FIGS. 12 to 14 are graphs showing an example of relations between the temperature of foreign matter and the resistance value of the power receiving coil in the first embodiment. An axis of ordinates in FIGS. 12 to 14 indicates the temperature of foreign matter or the resistance value of the coil. An axis of abscissas in FIGS. 10 to 12 indicates the position of foreign matter. The unit of the temperature is a degree (° C.). The unit of the resistance value is a milliohm (mΩ). The unit of the position is a millimeter (mm). On the axis of abscissas, with the center of the coil as an origin, a position on a predetermined straight line parallel to the coil surface of the coil which straight line includes the center of the coil is measured as the position of foreign matter. In addition, results of measurement of the temperature of foreign matter are plotted as circular marks in FIGS. 12 to 14. Results of measurement of the resistance value of the power receiving coil 220 are plotted as square marks in FIGS. 12 to 14.

FIG. 12 shows measurement results in a case where an iron 0.5 mm thick and 7 mm square is inserted as foreign matter between the coils. FIG. 13 shows measurement results in a case where an iron 0.5 mm thick and 13 mm square is inserted as foreign matter between the coils. FIG. 14 shows measurement results in a case where an iron 0.5 mm thick and 20 mm square is inserted as foreign matter between the coils.

As illustrated in FIGS. 12 to 14, when foreign matter is placed at a position slightly away from the center of the coil, the temperature of the foreign matter increases, and the resistance value of the coil (220) also rises. On the other hand, when the foreign matter is placed around the center, the temperature of the foreign matter decreases, and the resistance value of the coil also decreases. This is because, as described above, a Joule heat is generated by an eddy current within the foreign matter, and parameters such as the resistance value of the coil and the like are changed by the action of a magnetic field generated by the eddy current.

Incidentally, in FIGS. 12 to 14, the temperature when the position is negative numbers is not measured. This is because temperature changes when the position is negative numbers are estimated to be similar to changes when the position is positive numbers.

Thus, according to the first embodiment, the power receiving device 200 can apply the alternating voltage to the power receiving coil, obtain an amount of change in the impedance of the power receiving coil 220 from the alternating voltage and the current produced in the power receiving coil, and detect foreign matter on the basis of the amount of change. Because the amount of change in the impedance changes when foreign matter is mixed in between the coils, the foreign matter can be detected correctly from the amount of change in the impedance.

Incidentally, the noncontact power feeding system in the first embodiment uses the power feeding coil 120 and the power receiving coil 220 to feed power and transmit and receive control signals. However, the noncontact power feeding system may be provided with coils for transmitting and receiving control signals separately from the power feeding coil 120 and the power receiving coil 220, and the power feeding device 100 and the power receiving device 200 may transmit and receive control signals using the coils.

2. Second Embodiment

Example of Configuration of Foreign Matter Detecting Section

Figure 15:
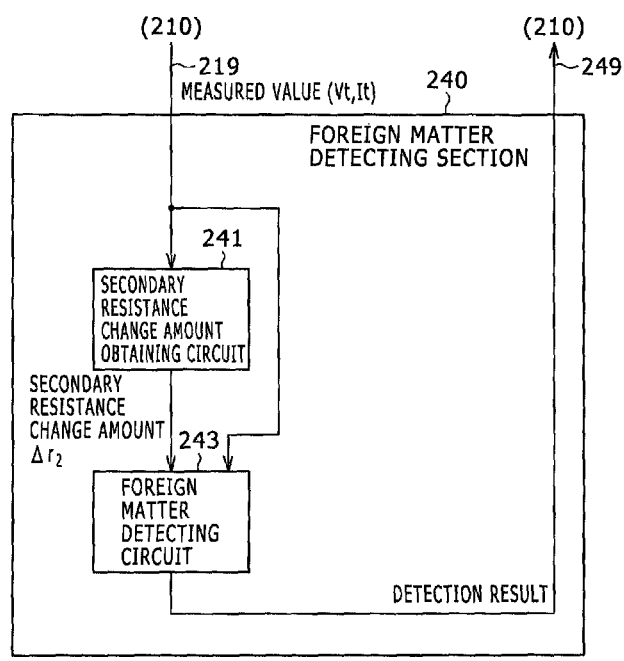
FIG. 15 is a block diagram showing an example of configuration of a foreign matter detecting section in a second embodiment.

FIG. 15 is a block diagram showing an example of configuration of a foreign matter detecting section 240 in a second embodiment. The foreign matter detecting section 240 in the second embodiment is different from that of the first embodiment in that the foreign matter detecting section 240 in the second embodiment does not obtain an amount of change $\Delta L_2$ in secondary inductance, but detects whether or not foreign matter is present from only an amount of change $\Delta r_2$ in secondary resistance. Specifically, the foreign matter detecting section 240 in the second embodiment is different from that of the first embodiment in that the foreign matter detecting section 240 in the second embodiment does not include the secondary inductance change amount obtaining circuit 242.

A foreign matter detecting circuit 243 in the second embodiment detects foreign matter from an amount of change $\Delta r_2$ in secondary resistance and a current $I_t$. For example, the foreign matter detecting circuit 243 calculates $\Delta r_2 \times I_t \times I_t$, and determines that foreign matter is present when the value of $\Delta r_2 \times I_t \times I_t$ is equal to or larger than a threshold value Th1'. This is because an amount of Joule heat generated by an eddy current is proportional to $\Delta r_2 \times I_t \times I_t$.

[Example of Operation of Power Receiving Device]

Figure 16:
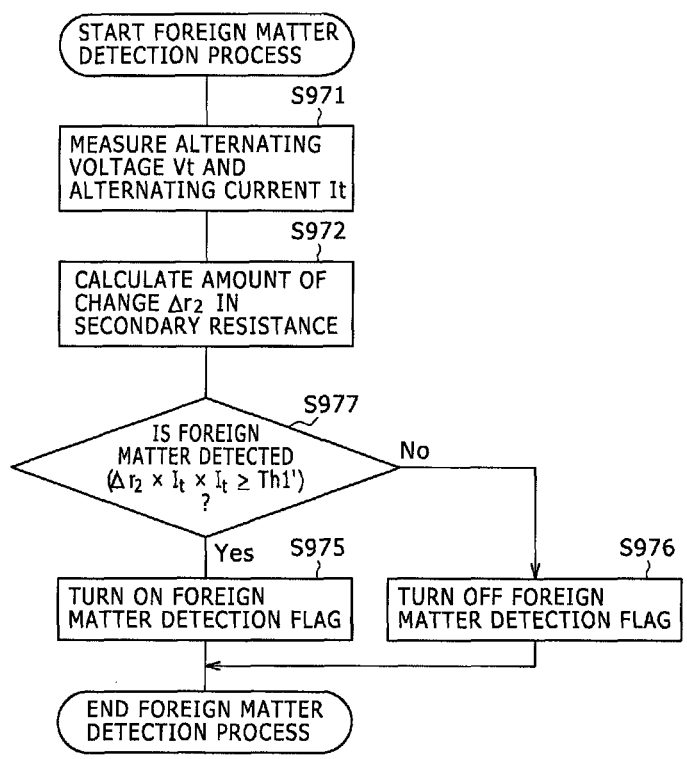
FIG. 16 is a flowchart of an example of a foreign matter detection process in the second embodiment.

FIG. 16 is a flowchart of an example of a foreign matter detection process in the second embodiment. The foreign matter detection process in the second embodiment is different from that of the first embodiment in that the foreign matter detection process in the second embodiment performs step S977 in place of steps S973 and S974.

After the power receiving device 200 calculates the amount of change $\Delta r_2$ in the secondary resistance (step S972), the power receiving device 200 determines whether or not foreign matter is detected on the basis of whether or not $\Delta r_2 \times I_t \times I_t$ is equal to or larger than the threshold value Th1' (step S977). When foreign matter is detected (step S977: Yes), the power receiving device 200 turns on a foreign matter detection flag (step S975). When no foreign matter is detected (step S977: No), on the other hand, the power receiving device 200 turns off the foreign matter detection flag (step S976).

Thus, according to the second embodiment of the present technology, the power receiving device 200 can detect foreign matter that can generate heat, from the amount of change $\Delta r_2$ in the secondary resistance and the current $I_t$. The noncontact power feeding system can therefore prevent the heat generation of the foreign matter by controlling an amount of fed power when the foreign matter is detected.

3. Third Embodiment

Example of Configuration of Foreign Matter Detecting Section

Figure 17:
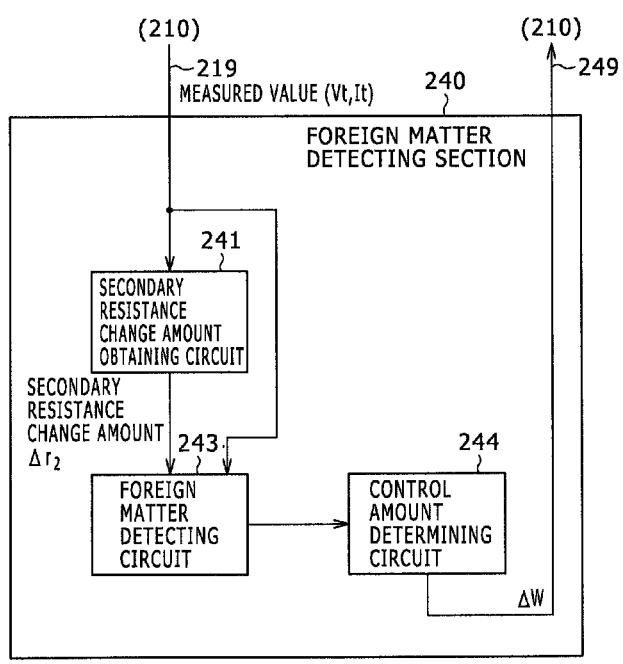
FIG. 17 is a block diagram showing an example of configuration of a foreign matter detecting section in a third embodiment.

FIG. 17 is a block diagram showing an example of configuration of a foreign matter detecting section 240 in a third embodiment. The foreign matter detecting section 240 in the third embodiment is different from that of the second embodiment in that the foreign matter detecting section 240 in the third embodiment further includes a control amount determining circuit 244. The control amount determining circuit 244 calculates an amount of control $\Delta W$ for an amount of fed power when there is foreign matter. On the other hand, the control amount determining circuit 244 sets a value of "0" to the amount of control $\Delta W$ when there is no foreign matter. The control amount determining circuit 244 outputs the amount of control $\Delta W$ as a detection result to a charging control section 210. Incidentally, the control amount determining circuit 244 is an example of a control amount determining section described in claims.

An amount of rise $\Delta T$ in temperature of foreign matter is generally obtained by the following Equation 7 from the thermal resistance Rt of the foreign matter. The unit of the thermal resistance Rt is for example a degree/watt (° C./W).

$$\Delta T \approx \Delta r_2 \times I_t \times I_t / R_t \qquad \text{Equation 7}$$

In Equation 7, $I_t$ without a dot attached thereto denotes the absolute value of an alternating current $I_t$.

Suppose that the value of the current $I_t$ of a power receiving coil 220 in a case where there is an amount of rise $\Delta T$ to such a degree as not to cause damage to the device or the like is $I_{2L}$ in Equation 7. Letting η be power feeding efficiency, a supply power $W_{1L}$ necessary to generate the current $I_{2L}$ is calculated from the following Equation 8.

$$W_{1L} = \eta \times W_{2L} = \eta \times (R_2 + r_0) \times I_{2L} \times I_{2L} \qquad \text{Equation 8}$$

In Equation 8, $W_{2L}$ is received power when the current $I_t$ is $I_{2L}$.

Meanwhile, letting $I_{2H}$ be the induced current of the power receiving coil 220 when foreign matter is detected, a supply power $W_{1H}$ necessary to generate the current $I_{2H}$ is calculated from the following Equation 9.

$$W_{1H} = \eta \times W_{2H} = \eta \times (R_2 + r_2) \times I_{2H} \times I_{2H} \qquad \text{Equation 9}$$

In Equation 9, $W_{2H}$ is received power when the current $I_t$ is $I_{2H}$.

The amount of control $\Delta W$ is calculated from the following Equation 10 on the basis of Equation 7 and Equation 9. Incidentally, the power feeding efficiency assumed by a power receiving device 200 may be different from an actual value, or the power receiving device 200 may not be able to obtain the power feeding efficiency itself. Accordingly, the power receiving device 200 may transmit a ratio ($\Delta W/W_{2H}$) between the received power $W_{2H}$ and the amount of control $\Delta W$ or a value of $W_{2H}-W_n$ to a power feeding device 100 in place of the amount of control $\Delta W$. It suffices for the power feeding device 100 to convert the received value into the amount of control $\Delta W$ on the basis of Equations 7 to 9, and control an amount of fed power.

$$\Delta W = W_{1H} - W_{1L} \qquad \text{Equation 10}$$

[Example of Operation of Power Receiving Device]

Figure 18:
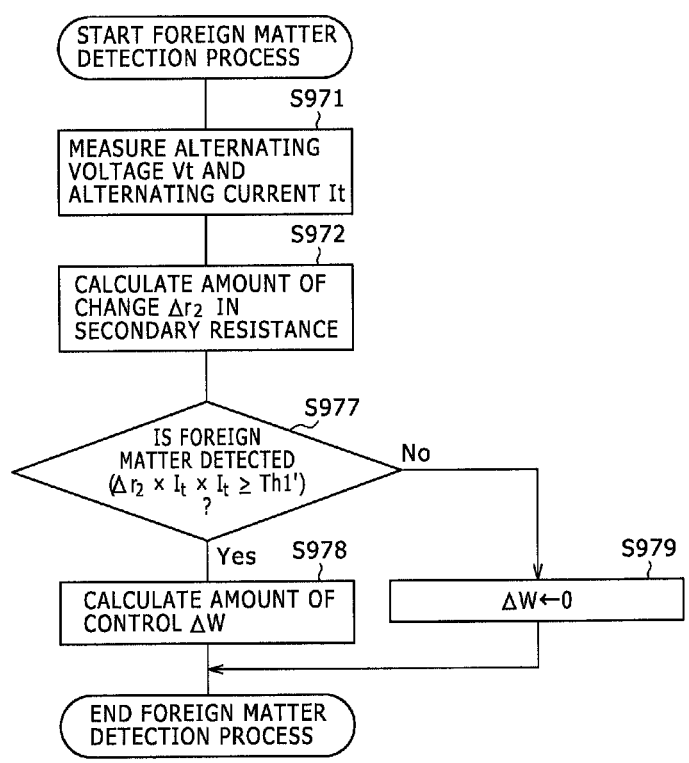
FIG. 18 is a flowchart of an example of a foreign matter detection process in the third embodiment.

FIG. 18 is a flowchart of an example of a foreign matter detection process in the third embodiment. The foreign matter detection process in the third embodiment is different from that of the second embodiment in that the foreign matter detection process in the third embodiment performs steps S978 and S979 in place of steps S975 and S976. When there is foreign matter (step S977: Yes), the power receiving device 200 calculates the amount of control $\Delta W$ using Equation 10 (step S978). When there is no foreign matter (step S977: No), on the other hand, the power receiving device 200 sets "0" to the amount of control $\Delta W$ (step S979).

[Example of Operation of Power Receiving Device]

Figure 19:
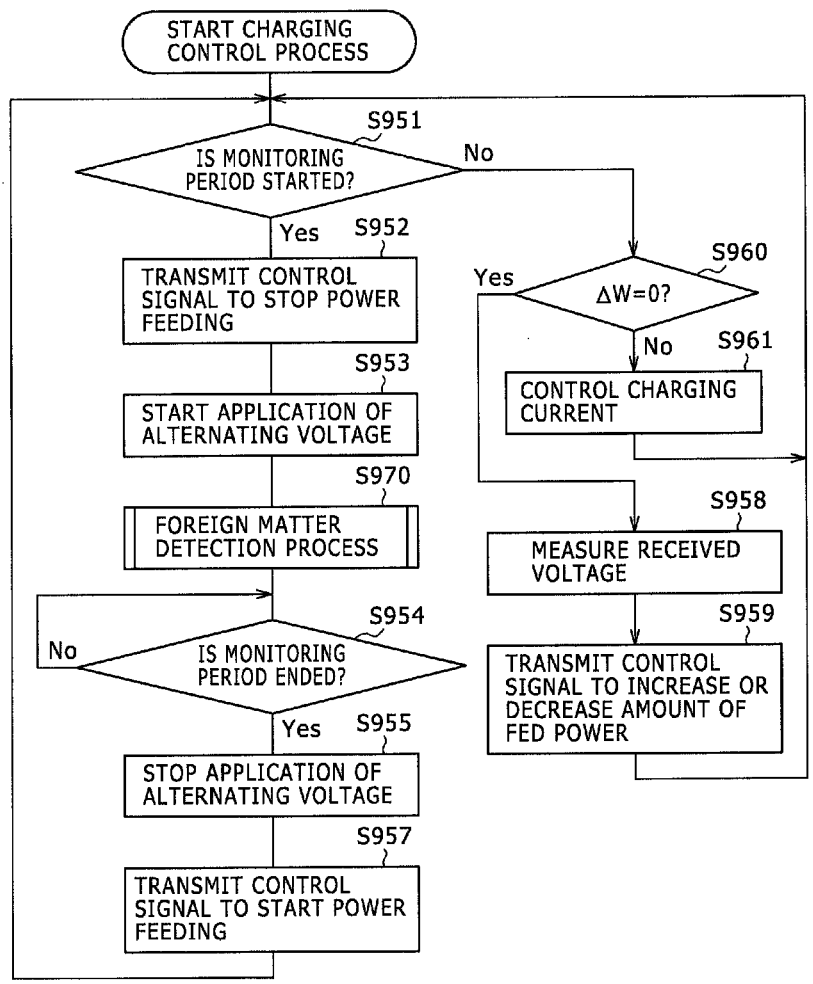
FIG. 19 is a flowchart of an example of a charging control process in the third embodiment.

FIG. 19 is a flowchart of an example of a charging control process in the third embodiment. The charging control process in the third embodiment is different from that of the first embodiment in that the charging control process in the third embodiment performs step S960 in place of step S956.

After the power receiving device 200 stops the application of an alternating voltage (step S955), the power receiving device 200 performs step S957 without performing step S956. When a monitoring period is not started (step S951), the power receiving device 200 determines whether the amount of control $\Delta W$ is zero (step S960). When the amount of control $\Delta W$ is not zero (step S960: No), the power receiving device 200 controls a charging current. The power receiving device 200 then transmits a control signal to perform $\Delta W$ control of an amount of fed power to the power feeding device 100 as required (step S961), and returns to step S951. When the amount of control $\Delta W$ is zero (step S960: Yes), the power receiving device 200 performs steps S958 and S959.

Thus, according to the third embodiment of the present technology, the power receiving device 200 can detect foreign matter, and obtain an amount of control for an amount of power. The noncontact power feeding system can therefore continue power feeding with an appropriate amount of power even when foreign matter is detected.

It is to be noted that the foregoing embodiments represent an example for embodying the present technology, and that items in the embodiments have respective corresponding relations to specific inventive items in claims. Similarly, specific inventive items in claims have respective corresponding relations to items given the same names as the specific inventive items in the embodiments of the present technology. However, the present technology is not limited to the embodiments, and can be embodied by making various modifications to the embodiments without departing from the spirit of the present technology.

In addition, the process procedures described in the foregoing embodiments may be construed as a method having the series of procedures, and may be construed as a program for making a computer perform the series of procedures or a recording medium storing the program. Usable as the recording medium is for example a CD (Compact Disc), an MD (Minidisc), a DVD (Digital Versatile Disk), a memory card, or a Blu-ray disc (registered trademark).

Incidentally, the present technology can also adopt the following constitutions.

(1) A power receiving device including:
a power receiving coil configured to receive power when a power feeding device supplies the power via a magnetic field;
an alternating-current power supply configured to apply an alternating voltage to the power receiving coil; and
a foreign matter detecting section configured to generate an amount of change in impedance of the power receiving coil from a current induced in the power receiving coil to which the alternating voltage is applied and the alternating voltage, and detect foreign matter between the power receiving coil and the power feeding device on a basis of the amount of change.

(2) The power receiving device according to the above (1), further including
a power supply control block configured to control the power feeding device on a basis of a result of detection of the foreign matter.

(3) The power receiving device according to the above (2),
wherein at a time of the detection of the foreign matter between the power feeding device supplying the power and the power receiving device, the power supply control block controls the alternating-current power supply to make the alternating-current power supply apply the alternating voltage after controlling the power feeding device to make the power feeding device stop supplying the power.

(4) The power receiving device according to the above (3),
wherein the power supply control block alternately repeats a power feeding period for controlling the power feeding device and a monitoring period for detecting the foreign matter, and makes the power feeding device supply the power in the power feeding period and makes the alternating-current power supply apply the alternating voltage in the monitoring period.

(5) The power receiving device according to the above (4),
wherein the power supply control block makes the power feeding device supply the power in the power feeding period when it is determined that the foreign matter is not present.

(6) The power receiving device according to the above (4), further including
a control amount determining section configured to determine an amount of control for the power on a basis of the amount of change and the induced current when it is determined in the detection of the foreign matter that the foreign matter is present,
wherein the power supply control block controls the power feeding device according to the amount of control in the power feeding period when the amount of control is determined.

(7) The power receiving device according to any one of the above (2) to (6), further including
a control signal transmitting circuit configured to transmit a control signal for controlling the power feeding device to the power feeding device,
wherein the power supply control block controls the power feeding device by generating the control signal and making the control signal transmitting circuit transmit the control signal.

(8) The power receiving device according to any one of the above (1) to (7), further including a charging control circuit configured to control a charging current to a load connected to the power receiving device on a basis of a result of detection of the foreign matter.

(9) The power receiving device according to the above (8), further including
a control result transmitting circuit configured to transmit a result of control of the charging current to the power feeding device.

(10) The power receiving device according to any one of the above (1) to (9),
wherein the impedance includes at least one of a resistance and a reactance of the power receiving coil.

(11) The power receiving device according to any one of the above (1) to (10),
wherein the foreign matter detecting section determines that the foreign matter is present when the amount of change exceeds a predetermined threshold value.

(12) The power receiving device according to any one of the above (1) to (11),
wherein the impedance includes a resistance of the power receiving coil, and
the foreign matter detecting section generates an eddy-current loss of the foreign matter from an amount of change in the resistance and the induced current, and determines that the foreign matter is present when the eddy-current loss exceeds a predetermined threshold value.

(13) A control method of a power receiving device, the control method including:
generating, by a foreign matter detecting section, an amount of change in impedance of a power receiving coil from a current induced in the power receiving coil to which an alternating voltage is applied and the alternating voltage; and
detecting, by the foreign matter detecting section, foreign matter between the power receiving coil and a power feeding device on a basis of the amount of change.

(14) A power feeding system including:
a power feeding device configured to supply power via a magnetic field; and
a power receiving device configured to include a power receiving coil for receiving the power, an alternating-current power supply for applying an alternating voltage to the power receiving coil, and a foreign matter detecting section configured to generate an amount of change in impedance of the power receiving coil from a current induced in the power receiving coil to which the alternating voltage is applied and the alternating voltage, and detect foreign matter between the power receiving coil and the power feeding device on a basis of the amount of change.

The present technology contains subject matter related to that disclosed in Japanese Priority Patent Application JP 2012-089053 filed in the Japan Patent Office on Apr. 10, 2012, the entire content of which is hereby incorporated by reference.

What is claimed is:
1. A power feeding device, comprising:
a power feeding coil configured to provide power fed to
a power receiving device via a magnetic field; and
a power feeding control section configured to receive a control signal from the power receiving device to control the power fed to the power receiving device,
wherein the power receiving device includes:
a power receiving coil;
an alternating-current power supply; and
a foreign matter detecting section, wherein the power receiving coil is configured to receive the power, wherein the alternating-current power supply is con- figured to apply an alternating voltage to the power receiving coil, and wherein the foreign matter detecting section is configured to:

generate an amount of change in impedance of the power receiving coil from a current induced in the power receiving coil to which the alternating voltage is applied and the alternating voltage; and detect foreign matter between the power receiving coil and the power feeding device on a basis of the amount of change.

2. The power feeding device according to claim 1, wherein the power feeding device is controlled on a basis of a result of detection of the foreign matter.

3. The power feeding device according to claim 1, wherein at a time of the detection of the foreign matter between the power feeding device supplying the power and the power receiving device, the alternating-current power supply is configured to apply the alternating voltage after controlling the power feeding device to stop supplying the power.

4. The power feeding device according to claim 3, wherein a power feeding period for controlling the power feeding device and a monitoring period for detecting the foreign matter alternately repeat, wherein the power feeding device is configured to supply the power in the power feeding period and the alternating-current power supply is configured to apply the alternating voltage in the monitoring period.

5. The power feeding device according to claim 4, wherein the power feeding device is configured to supply the power in the power feeding period based on the determination that the foreign matter is absent.

6. The power feeding device according to claim 4, wherein an amount of control for the power is determined on a basis of the amount of change and the induced current based on the determination that the foreign matter is present, and wherein the power feeding device is controlled according to the amount of control in the power feeding period based on determination of the amount of control.

7. The power feeding device according to claim 1, wherein a charging current to a load connected to the power receiving device is controlled on a basis of a result of detection of the foreign matter.

8. The power feeding device according to claim 7, wherein the power feeding device is configured to receive a result of control of the charging current.

9. The power feeding device according to claim 1, wherein the impedance includes at least one of a resistance or a reactance of the power receiving coil.

10. The power feeding device according to claim 1, wherein the foreign matter detecting section is configured to determine that the foreign matter is present based on the amount of change exceeding a threshold value.

11. The power feeding device according to claim 1, wherein the impedance includes a resistance of the power receiving coil, and wherein the foreign matter detecting section is configured to:

generate an eddy-current loss of the foreign matter from an amount of change in the resistance and the induced current; and determine that the foreign matter is present based on the eddy-current loss exceeding a threshold value.

* * * * *